United States Patent
Hendler (10) Patent No.: US 7,298,715 B2
(45) Date of Patent: Nov. 20, 2007

(54) COMMUNICATION RECEIVER WITH SIGNAL PROCESSING FOR BEAM FORMING AND ANTENNA DIVERSITY

(75) Inventor: Hillel Hendler, Jerusalem (IL)

(73) Assignee: Vyyo Ltd, Har Hotzvim Jerusalem (IL)

( * ) Notice: Subject to any disclaimer, the term of this patent is extended or adjusted under 35 U.S.C. 154(b) by 1291 days.

(21) Appl. No.: 09/809,562

(22) Filed: Mar. 14, 2001

(65) Prior Publication Data

US 2002/0024975 A1    Feb. 28, 2002

Related U.S. Application Data

(60) Provisional application No. 60/189,329, filed on Mar. 14, 2000.

(51) Int. Cl.
H04B 7/185    (2006.01)

(52) U.S. Cl. .............. 370/317; 370/535; 455/132

(58) Field of Classification Search .............. 370/334, 370/535, 536, 537, 538, 539, 540, 317; 455/101, 455/132, 137, 140
See application file for complete search history.

(56) References Cited

U.S. PATENT DOCUMENTS

| | | | |
|---|---|---|---|
| 4,010,465 A | | 3/1977 | Dodington et al. |
| 4,099,121 A | | 7/1978 | Fang |
| 4,385,384 A | | 5/1983 | Rosbury et al. |
| 5,050,167 A | * | 9/1991 | Izadpanah .................. 370/535 |
| 5,052,024 A | | 9/1991 | Moran, III et al. |
| 5,093,667 A | * | 3/1992 | Andricos .................. 342/372 |
| 5,198,992 A | * | 3/1993 | McCaslin .................. 708/312 |
| 5,272,700 A | | 12/1993 | Hansen et al. |
| 5,311,550 A | | 5/1994 | Fouche et al. |
| 5,377,035 A | | 12/1994 | Wang et al. |
| 5,408,349 A | | 4/1995 | Tsushima et al. |

(Continued)

FOREIGN PATENT DOCUMENTS

CA    2187141    4/1998

(Continued)

OTHER PUBLICATIONS

Golestani, S. (1995) "Network Delay Analysis of a Class of Fair Queueing Algorithms", *IEEE Journal on Selected Areas in Communication* 13(6):1057-1070.

(Continued)

*Primary Examiner*—Chau Nguyen
*Assistant Examiner*—Christine Ng
(74) *Attorney, Agent, or Firm*—Pearl Cohen Zedek Latzer, LLP (57) ABSTRACT

The present invention provides a technique to reduce the number of RF components by using digital signal processing functions in wireless receivers having two or more antennas, which results in the reduction of system cost. The reduction occurs by using a multiplexer or switch to sample the signal received by each of the antennas. The sampling rate of the multiplexer or switch is greater than the Nyquist required sampling rate (Fs) of the received signal bandwidth. The sampled signal is a multiplexed single analog (RF) signal, which only requires one chain of receiver components. A signal processor then is able to demultiplex the received signal at a lower frequency and can perform several functions including antenna diversity and beam forming utilizing digital signals at IF or baseband frequencies.

2 Claims, 5 Drawing Sheets

Antenna Diversity & Beam Forming - Signal Processing Implementation
Genral Block Diagram

U.S. PATENT DOCUMENTS

| Patent | | Date | Inventor(s) | Class |
|---|---|---|---|---|
| 5,418,452 | A * | 5/1995 | Pyle | 324/158.1 |
| 5,471,645 | A | 11/1995 | Felix | |
| 5,481,542 | A | 1/1996 | Logston et al. | |
| 5,481,561 | A | 1/1996 | Fang | |
| 5,487,099 | A | 1/1996 | Maekawa | |
| 5,510,859 | A | 4/1996 | Douglass et al. | |
| 5,557,612 | A | 9/1996 | Bingham | |
| 5,590,409 | A | 12/1996 | Sawahashi et al. | |
| 5,596,604 | A | 1/1997 | Cioffi et al. | |
| 5,606,664 | A | 2/1997 | Brown et al. | |
| 5,625,874 | A | 4/1997 | Uchida et al. | |
| 5,634,206 | A | 5/1997 | Reed et al. | |
| 5,666,646 | A | 9/1997 | McCollum et al. | |
| 5,724,385 | A | 3/1998 | Levin et al. | |
| 5,734,589 | A | 3/1998 | Kostreski et al. | |
| 5,740,525 | A | 4/1998 | Spears | |
| 5,752,161 | A | 5/1998 | Jantti et al. | |
| 5,796,783 | A | 8/1998 | Crawford | |
| 5,809,090 | A | 9/1998 | Buternowsky et al. | |
| 5,809,406 | A | 9/1998 | Taki et al. | |
| 5,809,427 | A | 9/1998 | Perreault et al. | |
| 5,818,825 | A | 10/1998 | Corrigan et al. | |
| 5,831,690 | A | 11/1998 | Lyons et al. | |
| 5,859,842 | A * | 1/1999 | Scott | 370/342 |
| 5,859,874 | A * | 1/1999 | Wiedeman et al. | 375/267 |
| 5,862,451 | A | 1/1999 | Grau et al. | |
| 5,867,528 | A | 2/1999 | Verbueken | |
| 5,896,414 | A | 4/1999 | Meyer et al. | |
| 5,903,558 | A | 5/1999 | Jones et al. | |
| 5,909,384 | A | 6/1999 | Tal et al. | |
| 5,937,005 | A | 8/1999 | Obuchi et al. | |
| 5,940,743 | A | 8/1999 | Sunay et al. | |
| 5,963,843 | A | 10/1999 | Sit et al. | |
| 5,963,870 | A | 10/1999 | Chheda et al. | |
| 5,974,106 | A | 10/1999 | Dupont | |
| 5,978,855 | A | 11/1999 | Metz et al. | |
| 5,991,286 | A | 11/1999 | Labonte et al. | |
| 6,009,310 | A | 12/1999 | Motohashi | |
| 6,035,008 | A | 3/2000 | Kim | |
| 6,052,408 | A | 4/2000 | Trompower et al. | |
| 6,072,839 | A | 6/2000 | Mondal et al. | |
| 6,075,787 | A | 6/2000 | Bobeck et al. | |
| 6,111,887 | A | 8/2000 | Daily et al. | |
| 6,112,232 | A | 8/2000 | Shahar et al. | |
| 6,128,588 | A | 10/2000 | Chacon | |
| 6,140,911 | A | 10/2000 | Fisher et al. | |
| 6,141,356 | A | 10/2000 | Gorman | |
| 6,157,311 | A | 12/2000 | Berkovich | |
| 6,160,447 | A | 12/2000 | Huang | |
| 6,172,970 | B1 | 1/2001 | Ling et al. | |
| 6,185,227 | B1 | 2/2001 | Sipola | |
| 6,195,697 | B1 | 2/2001 | Bowman-Amuah | |
| 6,240,072 | B1 * | 5/2001 | Lo et al. | 370/316 |
| 6,275,484 | B1 * | 8/2001 | Lynch et al. | 370/342 |
| 6,411,824 | B1 * | 6/2002 | Eidson | 455/561 |
| 6,549,527 | B1 * | 4/2003 | Tsutsui et al. | 370/342 |
| 6,701,141 | B2 * | 3/2004 | Lam | 455/273 |

FOREIGN PATENT DOCUMENTS

| | | |
|---|---|---|
| EP | 0021 544 A1 | 1/1981 |
| EP | 0025 767 A1 | 3/1981 |

OTHER PUBLICATIONS

Stiliadis, D. et al. (1998) "Rate-Proportional Servers: A Design Methodology for Fair Queueing Algorithms", *IEEE/ACM Transactions of Networking* 6(2):164-174.

Stiliadis, D. et al. (1998) "Efficient Fair Queuing Algorithms for Packet-Switched Networks", *IEEE/ACM Transactions of Networking* 6(2):175-185.

Data Over Cable Interface Specifications, Cable Modem Termination System-Network Side Interface Specification, SP-CMTS-NSII01-960702 (Jul. 2, 1996) pp. i-13.

Data-Over-Cable Service Interface Specifications, Cable Modem to Customer Premise Equipment Interface Specification. SP-CMC1-102-980317 (Mar. 17, 1998) pp. i-40.

Data-Over-Cable Service Interface Specifications, Radio Frequency Interface Specification, SP-RFI-I04-980724 (Jul. 24, 1998) pp. i-196.

Data-Over-Cable Service Interface Specifications, Operations Support System Interface Specification SP-OSSI-102-990113 (Jan. 13, 1999) pp. i-14.

Data-Over-Cable Service Interface Specifications, Operations Support System Interface Specification Radio Frequency Interface, SP-OSSI-RFI-103-990113 (Jan. 13, 1999) pp. i-29.

Data-Over-Cable Service Interface Specifications, Baseline Privacy Interface Specification, SP-BPI-102-990319 (Mar. 19, 1999) pp. i-88.

Data-Over-Cable Service Interface Specifications, Baseline Privacy Interface Specification, SP-BPI-102-990731 (Jul. 31, 1999) pp. i-160.

Data-Over-Cable Service Interface Specifications, Radio Frequency Interface Specification, SP-RFlv1.1-I03-991105 (Nov. 5, 1999) pp. i-366.

Data-Over-Cable Service Interface Specifications, Operations Support System Interface Specification SP-OSSlv1.1-D01-991115 (Nov. 15, 1999) pp. i-81.

Data-Over-Cable Service Interface Specifications, Operations Support System Interface Specification SP-OSSlv1.1-I03-001220 (Dec. 20, 2000) p. ii.

* cited by examiner

Fig 1: Antenna Diversity - Dual RF Channels Implementation (Prior Art)

Fig 2: RF Implementation Of Beam Forming (2 Elements Example)
(Prior Art)

Fig 3: Antenna Diversity & Beam Forming – Signal Processing Implementation Genral Block Diagram

Fig 4: Signal Processor Implementation Of Beam Forming

Fig 5: Signal Processor Implementation Of Diversity Antenna

COMMUNICATION RECEIVER WITH SIGNAL PROCESSING FOR BEAM FORMING AND ANTENNA DIVERSITY

CROSS REFERENCE TO RELATED APPLICATIONS AND CLAIM OF PRIORITY

This invention claims priority to the following now abandoned U.S. provisional patent application, which is incorporated herein by reference, in its entirety:

Hendler, Provisional Application Ser. No. 60/189,329, entitled "COMMUNICATION RECEIVER WITH SIGNAL PROCESSING FOR BEAM FORMING AND ANTENNA DIVERSITY," filed, Mar., 14, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to wireless communication receivers, and amongst other things to wireless communication receivers having signal processing capability for performing beam forming, antenna diversity, as well as other functions.

2. Discussion of Background

Wireless modems are used to interconnect computers or LANs using radio waves. Radio signals have advantages and disadvantages over hardwire systems. The wireless advantages include quick deployment, higher data rates than conventional telephone lines and the ability to serve customers independently of the traditional infrastructure.

The disadvantages of wireless transmission in the range of the MMDS/ITFS (multi-channel multi-point distribution system/instructional television fixed service) channels include fading and multi-path.

Wireless receivers utilize several techniques to overcome channel impairments like fading and multi-path. Once class of techniques to reduce fading and multi-path are referred to as beam forming. Beam forming techniques increase the antenna gain, and more importantly increases the antenna directivity while also allowing controllable direction selectivity. This enables reduction of external interference and improvement of the robustness against multi-path.

Another class of techniques to reduce problems associated with fading and multi-path are referred to as antenna diversity. Antenna diversity uses two or more antennas that are shifted in space by one or more wavelengths of the transmitted carrier frequency. The spatial shifting can influence and many times it reduces fading. Diversity involves downconverting and demodulating the received signal in parallel from the two or more antennas and then selecting the "best" signal by post detection decision criteria.

Figure 1:
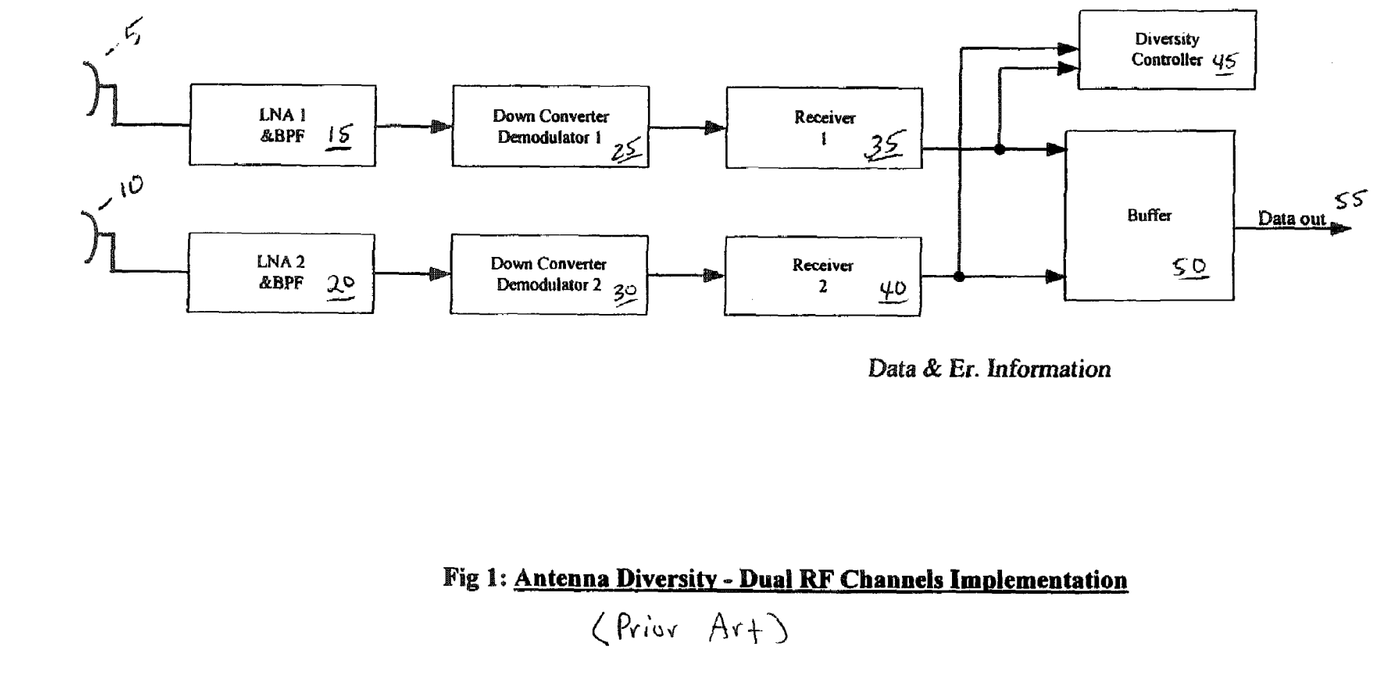
FIG. 1 is a block diagram of a known antenna diversity scheme for a wireless-receiver.

Referring to FIG. 1, a common technique used for antenna diversity in wireless systems is depicted. Each of the two antennas 5 and 10 is connected to a separate full channel receiver which includes a low noise amplifier (LNA) 15 and 20, a down converter 25 and 30, and a demodulator decoder 35 and 40. The demodulator decoders 30 and 40 each receive an analog signal either at an IF or a baseband frequency and then demodulate the analog signal to provide a digital signal which has also been error corrected. After decoding and error correcting the digital signal each demodulator decoder 30 and 40 delivers a decoded data stream, comprising data packets, along with error information related to each data packet of the digital signal. The digital signal from each of the demodulators 30 and 40 is delivered to the buffer 50, while the error information is delivered to diversity controller 45. The diversity controller 45 selects the best packet data stream from the one of the two demodulators 35 or 45 according to a predetermined minimum error criterion. The selected data packet is then provided at data output 55.

Figure 2:
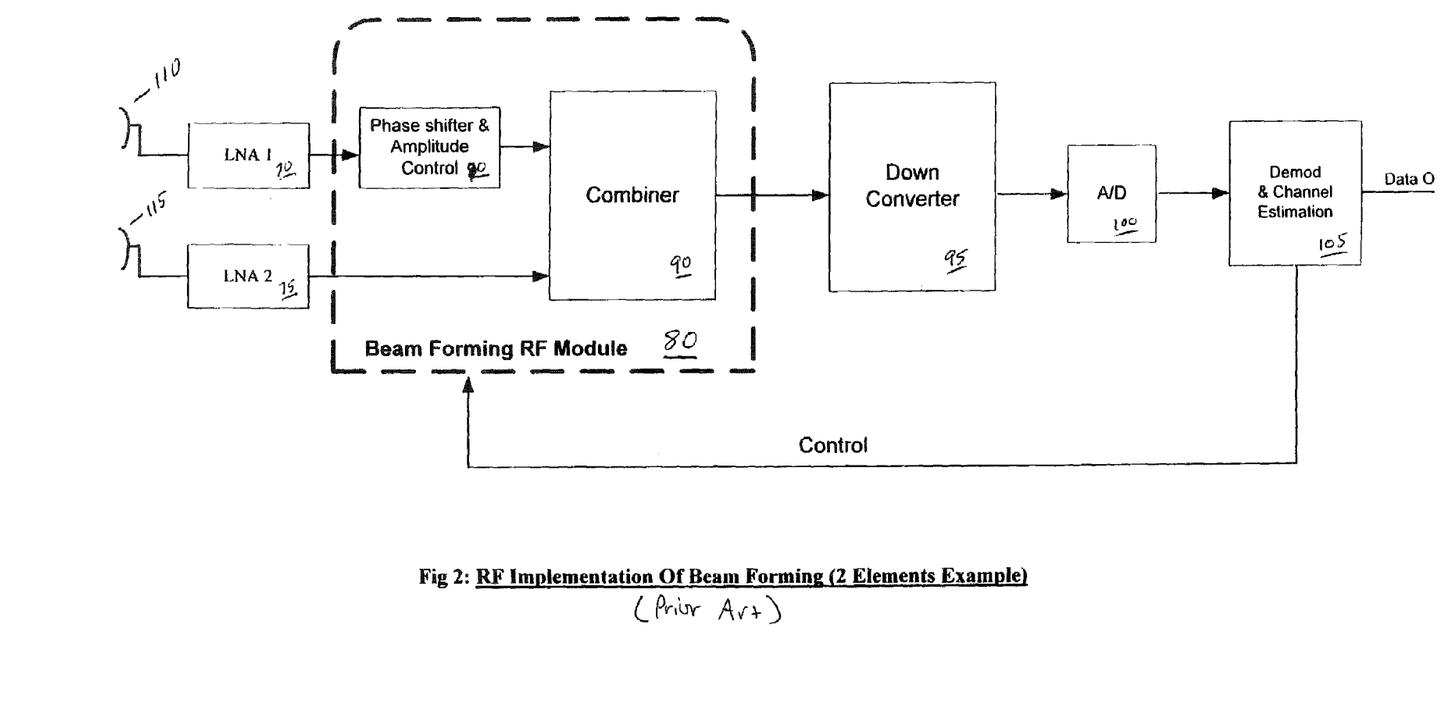
FIG. 2 is a block diagram of a known beam-forming scheme for a wireless receiver.

Referring to FIG. 2, a known technique used for beam forming in wireless receivers is depicted. The system of FIG. 2 utilizes vector combining, of amplitude and phase, of the signal received by each of two antennas 110 and 115. By amplitude balancing and adjusting the phase of the relative signals a shift in the direction of the combined antenna beam is achieved. The two received signals are typically combined in a beam forming RF module 80 that operates at the transmitted RF frequency. The signals from each of the two antennas 110 and 115 after been amplified by the attached low noise amplifier 70 and 75 is delivered to the beam forming module 80. The beam-forming module 80 includes a phase shift and amplitude control unit 85 and a RF combiner 90. The combined signal output by combiner 90 is a standard received signal at RF. The combined signal is then provided to a downconverter 95 and then to analog to digital converter (A/D) 100. The digital signal is provided to a demodulator 105 with a channel estimation capability. The demodulator 105 utilizes the estimation capability to control the beam forming RF module for optimization of the received signal and for error minimization. The two antenna elements as described in FIG. 2 are very common for low cost wireless applications, but the same concept can be used with more antennas. Therefore, the beam-forming scheme depicted in FIG. 2 can be implemented with two antennas or with a phased array.

The techniques described with respect to FIGS. 1 & 2 require a full receiving chain for each antenna. This is both expensive and increases the potential points of failure in a wireless receiver.

SUMMARY OF THE INVENTION

The present invention provides a technique to reduce the number of RF components by using digital signal processing functions in wireless receivers having two or more antennas, which results in the reduction of system cost. The reduction occurs by using an RF multiplexer or RF switch to sample the signal received by each of the antennas. By sampling the RF signal from the two (or more) antennas, the invention enables to implement a single RF chain, instead of dual (or more) RF chains in a conventional implementation of beam forming or antenna diversity. The sampling rate of the multiplexer or switch is greater than the Nyquist required sampling rate (Fs) of the received signal bandwidth. The sampled signal is a multiplexed single analog (RF) signal, which only requires one chain of receiver components. A signal processor then is able to demultiplex the received signal at a lower frequency and can perform several functions including antenna diversity and beam forming utilizing digital signals at IF or baseband frequencies. The present invention may also be applied to signals other than RF, including, but not limited to, High Frequency (HF) signals, Microwave, x-ray, optical, laser, or other signal types.

In one embodiment the present invention provides for a wireless communication receiver comprising at least two antennas each configured to receive a communication signal, a switch coupled to the at least two antennas and that provides a multiplexed signal, a downconverter that provides a downconverted multiplexed signal, and a signal processor that receives the downconverted signal and that provides a data signal.

In an additional embodiment, the present invention provides for a method for receiving a communication signal at a wireless communication device comprising at least two antennas. The method comprises receiving at each of at least two antennas a communication signal, sampling the communication signal to produce a sampled signal, down converting the sampled signal to generate a down converted signal, generating a digitized signal from the down converted signal, and demultiplexing the digitized signal to produce at least two digital signals each corresponding to the communication signal as received by the at least two antennas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention provides a technique to reduce the number of RF components by using digital signal processing functions in wireless receivers having two or more antennas, which results in the reduction of system cost. By sampling the RF signal from the two (or more) antennas, the invention enables to implement a single RF chain, instead of dual (or more) RF chains in a conventional implementation of beam forming or antenna diversity. The reduction occurs by using an RF multiplexer or RF switch to sample the signal received by each of the antennas. The sampling rate of the multiplexer or switch is greater than the Nyquist required sampling rate (Fs) of the received signal bandwidth. The sampled signal is a multiplexed single analog (RF) signal, which only requires one chain of receiver components. A signal processor then is able to demultiplex the received signal at a lower frequency and can perform several functions including antenna diversity and beam forming utilizing digital signals at IF or baseband frequencies.

Figure 3:
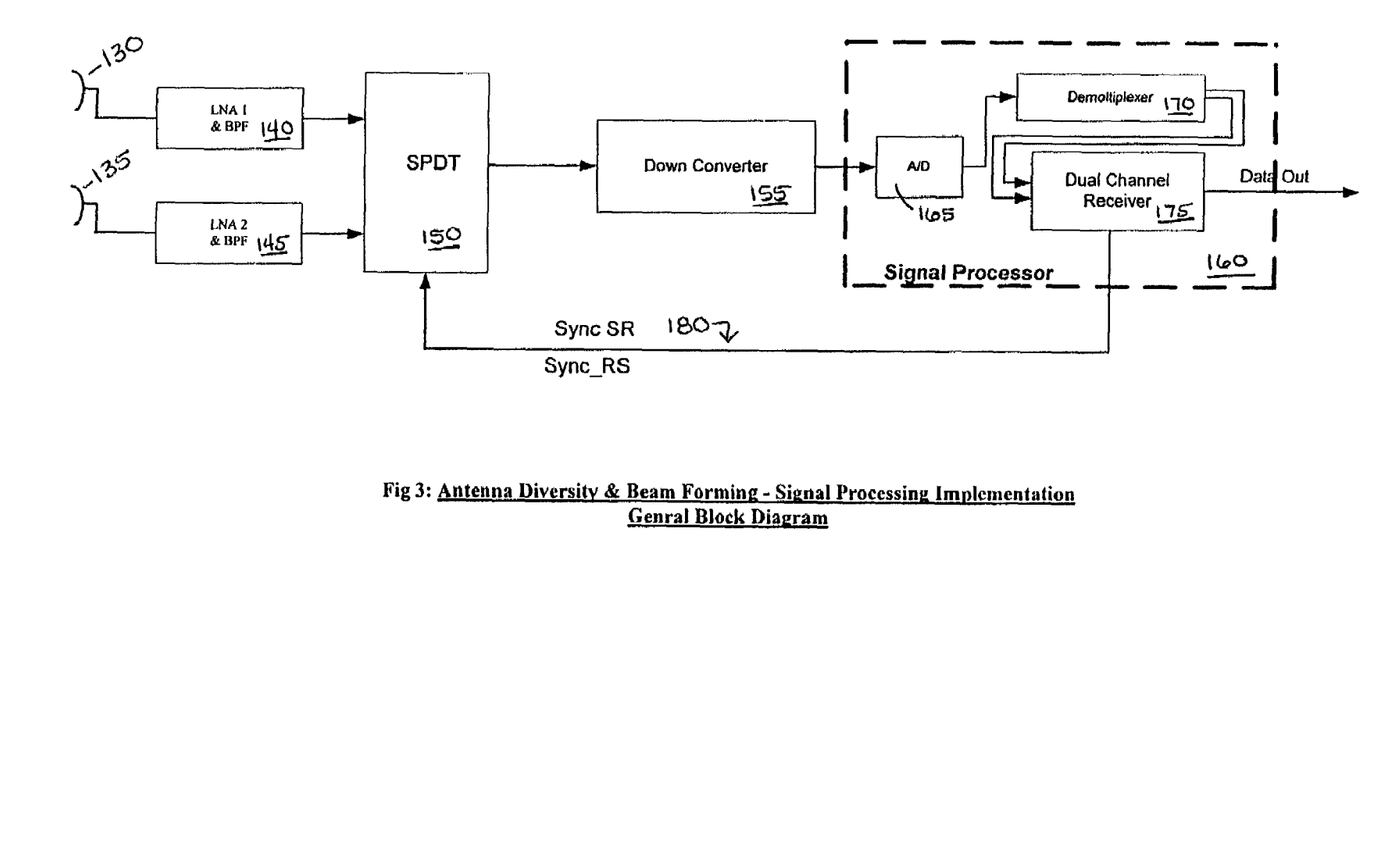
FIG. 3 is a block diagram of a presently preferred embodiment of an antenna diversity and beam forming wireless communication receiver according to the present invention.

Referring again to the drawings, wherein like reference numerals designate identical or corresponding parts, and more particularly to FIG. 3 thereof, there is illustrated a general block diagram of the signal processing implementation of the present invention. The received RF signals from the two antennas 130 and 135 is sequentially sampled by a single pole double through (SPDT) switch 150 which is used as a multiplexer. The switching rate ("SR") of the SPDT switch 150 should be at least twice the Nyquist required sampling rate ("Fs") for the received signal bandwidth. Since, the Nyquist sampling rate is greater then twice the signal bandwidth, the SPDT switch 150 sampling rate will be greater then four times bandwidth, e.g. Fs>2*BW signal and SR>2*Fs, where BW signal is the signal bandwidth. Generally SR will be selected to be N times Fs for N antennas.

The output signal of the SPDT is a multiplexed single analog (RF) signal, which comprises the RF signals received by the two antennas. The bandwidth of the multiplex signal at the output of the SPDT switch 150 is half of the switching rate (SR/2). This bandwidth is more than twice the bandwidth of the input RF signal for two antennas. This bandwidth requires that the rest of the receiving chain, e.g. the downconverter, has to support this higher bandwidth in order to enable de-multiplexing of the two signals at a later point.

The multiplexed signal is down converted by down converter 155 to an IF or baseband signal. The down converted signal is provided to an analog to digital converter 165 (A/D) which in turn provides the digital signal. The digital signal is demodulated and processed at the signal processor unit 160. The analog to digital converter 165 can be implemented externally to the signal processor 160 unit, or internally on the same chip.

At the signal processor 160 the digital signal is de-multiplexed by demultiplexer 170 and received at a dual channel receiver 175. The signal at each of the channels of the dual channel receiver is related to the signal at each of the antennas 130 135. The dual channel receiver 175 also provides a control signal to the SPDT switch 150 that synchronizes the switching rate SR with operation of the clocks of the dual channel receiver 175.

The dual channel receiver 175 can be configured to implement various functions, including simply providing multiple data signals, if each of the antennas 130 and 135 is positioned to receive a different communication signal. In addition, antenna diversity or beam forming can be fully accomplished at the signal processor as described with respect to FIG. 4 and FIG. 5.

It is presently preferred that a low noise amplifier 140 or 145 is used before the SPDT 150 for each of the antenna 130 and 135, to amplify the received signal and to maintain a maximum signal to noise ratio in the receiver.

A band pass filter (BPF) is included after each of the LNA 140 and 145. This BPF rejects out of band signals. The sampling rate SR at the SPDT 150 should be at least twice the bandwidth of this rejection BPF, in order to reduce interference from adjacent channels.

Although other combinations of components may be utilized, in one preferred embodiment, the LNAs 140, 145 and SPDT 150 are constructed on a single active RF chip. The band pass filter (BPF) between the LNA and the SPDT switch, can be implemented either on chip or externally.

The architecture of FIG. 3 was described above for a receiver with two antennas. The same concept can be used with higher number of antenna by multiplexing the RF input signal and demultiplexing at the signal processor. In this case, for receiving with N antennas the SPDT switch 150 will be replaced by a SPNT (N input and single output). For receiving with N antennas the switching rate will be the number of antennas multiplied by the required sampling rate per each antenna signal, e.g. SR=N*FS where N is the number of antennas, and FS>2*Bwsignal.

The same concept can be use for generating a multiplexed signal from several antennas with separate transmitters if their symbol rates are synchronized. This can be implemented as an example in point to multi point systems when the upstream symbol rate can be locked onto the common downstream symbol rate. In this case, after demultiplexing the signal in the signal processor 160, parallel demodulator blocks can be implemented in the same signal processor, e.g. signal processor 160. Such an architecture depends only on the signal processing capability of the signal processor, and can easily be achieved for low bit rate signals.

The cost reduction in the RF equipment allowed by the present invention is easily seen by comparing the common block diagrams of FIG. 1 and FIG. 2 with the presently preferred embodiment depicted in the block diagram of FIG. 3 due to the reduced number of components. For example, the known antenna diversity block diagram of FIG. 1 utilizes two down converters 25 and 30, versus one for the present invention. The cost savings over the system of FIG. 2 results from the elimination of the beam forming RF module 80, which includes complicated RF phase and amplitude controls.

Figure 4:
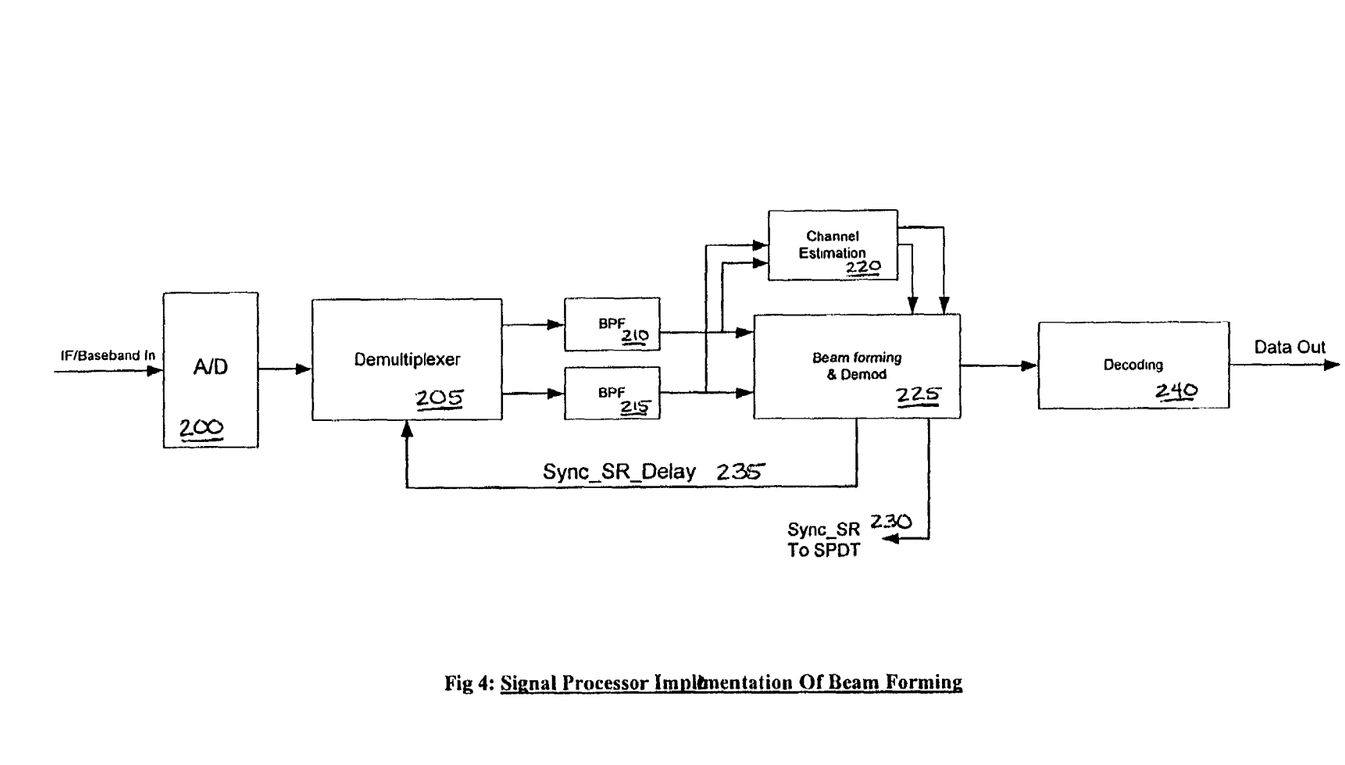
FIG. 4 is a block diagram of a presently preferred embodiment of a beam forming signal processor according to the present invention.

Referring to FIG. 4, a presently preferred configuration of the signal processor 160 utilized for beam forming is depicted. The analog multiplexed signal either at IF or baseband frequency, is converted to a digital signal by the A/D 200. The digital signal is de-multiplexed into a stream of two separate digital data streams, each of which is from a separate antenna. Each of the digital data streams is filtered by the appropriate digital Band Pass Filter (BPF) 210 and 215, for a bandwidth equal to the transmitted bandwidth. Since, the digital signals have the same amplitude and phases as the RF signals received at each of the front antennas, but have a much lower frequency carrier, e.g. IF or baseband compared to RF, a vector summation of these digital signals is equivalent to a vector summation of the RF. Therefore, controlling the amplitude and phase of these digital signals is equivalent to the same processing of the RF.

The two data streams are delivered to the Beam Forming and Demodulator block 225, and also to the Channel Estimation block 220. The beam forming processing is accomplished by summation of the two digital signals after amplitude balancing and phase shifting. The phase shifting enables control of the beam direction, as in a conventional RF beam forming process. By using more than two antennas, the beam can be optimized to have a spatial notch, to reject interference, as in conventional phased array techniques. The control of the phase and amplitude is accomplished by the channel estimator 220. The channel estimator controls the relative phase shift of the two data stream according to known algorithms that implements minimization of the data errors at the demodulator and decoder output.

The signal after the summation is demodulated as a regular signal, and the received data is decoded at the decoder 240 to deliver the final data output. During demodulation processing the carrier frequency and the sampling frequency Fs are extracted. From the extracted sampling frequency the demodulator acquires and provides a signal to synchronize the Sync SR To SPDT 230, and the Sync SR Delay 235. The Sync SR To SPDT 230 is the double sampling rate switching clock of the SPDT switch 150. The Sync SR Delay 235 is the corresponding delayed synchronized clock for the de-multiplexer 205. These two synchronization signals are at the same frequency, but the timing signal provided to the demodulator is delayed to compensate for the down converter and filter delays between the RF and the output of the A/D 200.

Figure 5:
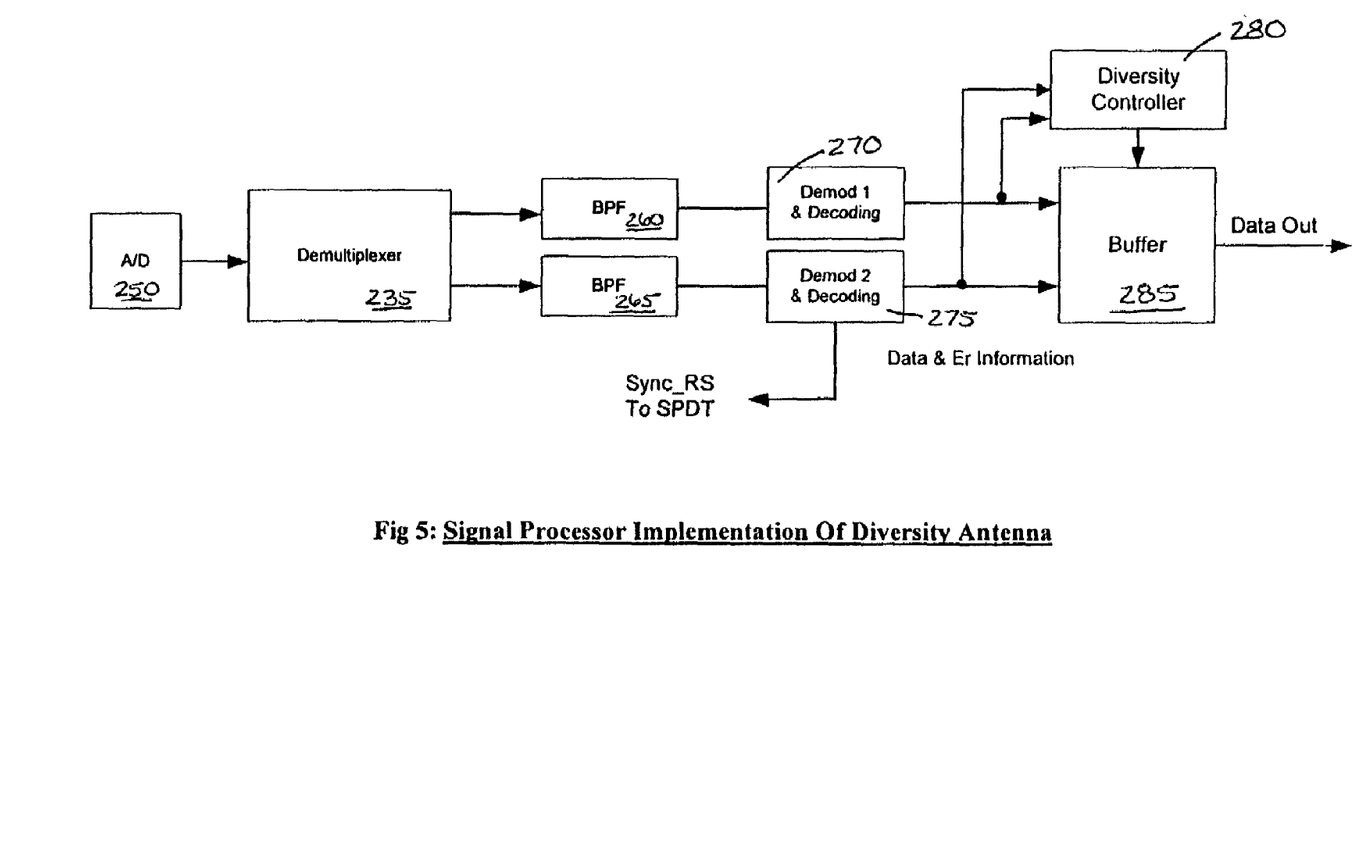
FIG. 5 is a block diagram of a presently preferred embodiment of an antenna diversity signal processor according to the present invention.

FIG. 5 a presently preferred configuration of the signal processor 160 for the performance of antenna diversity. The analog multiplexed signal either at IF or baseband frequency is converted to a digital signal by A/D 250. As was describe with respect to FIG. 4 above, this digital signal is de-multiplexed into a stream of two separate digital signals, each of them is related to a separate antenna by demultiplexer 235. Each of the digital data streams is then filtered to the transmitted bandwidth by the appropriate digital Band Pass Filter (BPF) 260 or 265. The two data streams are then demodulated and decoded in parallel by demodulator decoders 270 and 275. The two demodulated data streams are delivered to the buffer 285, while the error information is delivered to the diversity controller 280. The diversity controller 280 selects the best packet data stream from the two demodulators according to a minimum error criterion that is predetermined and based on the FEC. The selected data packet is the data output.

The architecture described with respect to FIG. 3 can be used with various modulation schemes, e.g. single carrier signals such as QAM, QPSK, BPSK or the like, as well as multiple carrier signals such as OFDM. In single carrier schemes, the demodulators used in the signal processor 160 will be the standard demodulator block for the modulation scheme.

For OFDM signals the band pass filters 210 and 215, and 260 and 265 are implemented by a FFT block which is a standard signal processing block. For OFDM type signals when each of the two data stream is split by the FFT block into multiple sub carriers data stream, the diversity scheme can be implemented by comparing the amplitude of each carrier and using the higher one for the demodulation process. This will significantly reduce the fading influence when it is not equally distributed on the signal bandwidth.

The beam forming processing of FIG. 4 can also be implemented to OFDM signals. For OFDM type signals each of the two data stream is split by the FFT block into multiple sub carriers data stream. The beam forming process 225 can be done separately on pairs of the same subcarrier from the two channels. This processing has the advantage of cannel estimation optimization per sub carrier, which has a higher improvement gain.

The signal processor 160 is currently preferred to be an integrated circuit, but can also be one or more separate elements. Further, even though FIGS. 4 and 5 depict the signal processor 160 as including A/D functionality, it should be noted that the A/D functionality may be separate from signal processor 160.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CDROMS, micro-drive, and magneto-optical disks, ROMs, RAMs, EPROMs, EEPROMs, DRAMs, VRAMS, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, multiplexing RF or other communication signals, downconverting the multiplexed signals, transporting the multiplexed signals through a single chain (e.g., RF chain, optic chain, etc.), de-multiplexing and using each signals in a related (or different) applications, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A communication receiver, comprising:
    a switch comprising,
    at least two inputs, each input configured to be coupleable to at least two signal carrying devices,
    a switching mechanism configured to multiplex signals received at said inputs; and
    an output configured to carry the multiplexed signal;
    a downconverter comprising an input coupled to the output of said switch and configured to downconvert the multiplexed signal; and
    a signal processor comprising an input coupled to receive the downconverted multiplexed signal and an output;
    wherein:
    said signal processor is configured to provide, at the signal processor output, a data signal substantially corresponding to data contained in a communication signal carried by the signal carrying devices;
    an A/D converter configured to convert the downconverted multiplexed signal to a digital signal;
    a demultiplexer configured to demultiplex the digital signal into at least two component digital signals, each component digital signal containing a digital representation of a portion of the communication signal;
    a channel estimator configured to receive the component digital signals and provide at least two estimation signals each related to a phase and amplitude shift of one of the at least two component digital signals;
    a beam-forming processor configured to receive the at least two component digital signals and the at least two estimations signals and provide a demodulated signal; and
    a decoder configured to receive the demodulated signal and provide the data signal;
    wherein said communication receiver is a wireless communication receiver and said signal carrying devices are antennas.

2. A communication, comprising:
    a switch comprising,
    at least two inputs, each input configured to coupleable to at least two signal carrying devices,
    a switching mechanism configured to multiplex signals received at said inputs; and
    an output configured to carry the multiplexed signal;
    a downconverter comprising an input coupled to the output of said switch and configured to downconvert the multiplexed signal; and
    a signal processor comprising an input coupled to receive the downconverted multiplexed signal and an output;
    wherein:
    said signal processor is configured to provide, at the signal processor output, a data signal substantially corresponding to data contained in a communication signal carried by the signal carrying devices;
    said communication receiver is a wireless communication receiver and said signal carrying devices are antennas; and
    the signal processor comprises:
    a demodulator that receives at least two digital signals each corresponding to a digital representation of a portion of the communication signal at a lower frequency which is received by one of the at least two antennas, the demodulator providing at least two demodulated signals each corresponding to one of the at least two digital signals and that provides at least two error signals each of which corresponds to an error rate of one of the demodulated signals with respect to an expected signal;
    a diversity controller that receives the at least two error signals and that provides a selection signal and that provides a selection signal indicative of which of the demodulated signals of the at least two demodulated signals has a lower error rate; and
    a memory that receives and stores the at least two demodulated signals, the memory outputting as the data signal one of the at least two demodulated signals in response to the selection signal.

* * * * *